(12) United States Patent
Hubbard et al.

(10) Patent No.: US 6,379,467 B1
(45) Date of Patent: Apr. 30, 2002

(54) COMPACTED STARCH HYDROLYSATE PRODUCT WITH IMPROVED HANDLING CHARACTERISTICS AND REDUCED TENDENCY TO BECOME STICKY

(75) Inventors: E. Daniel Hubbard, West Liberty; Robert L. Olson, Muscatine; Thomas A. Wiesner, Muscatine; Terry V. Andren, Muscatine; Frank Gute, Muscatine, all of IA (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 09/594,967

(22) Filed: Jun. 15, 2000

Related U.S. Application Data

(60) Provisional application No. 60/139,184, filed on Jun. 15, 1999.

(51) Int. Cl.$^7$ .......................... A23K 1/18; C08B 30/06; C08B 30/18
(52) U.S. Cl. .......................... 127/32; 127/71; 426/442; 426/454; 426/658; 426/661
(58) Field of Search .................. 127/32, 71; 426/442, 426/454, 658, 661

(56) References Cited

U.S. PATENT DOCUMENTS

| | | | |
|---|---|---|---|
| 4,810,307 A | | 3/1989 | Caton |
| 4,954,178 A | * | 9/1990 | Caton .......................... 127/32 |
| 5,378,471 A | * | 1/1995 | Smith .......................... 424/442 |

FOREIGN PATENT DOCUMENTS

| | | | |
|---|---|---|---|
| EP | 0 120 573 A2 | 2/1984 | |
| EP | 0 538 146 A1 | 4/1993 | |
| EP | 0 534 955 B1 | 5/1997 | |
| WO | WO 94/03073 | 2/1994 | |
| WO | WO 00/08949 | 2/2000 | |
| WO | WO 00/77050 A1 * | 12/2000 | ........... C08B/30/06 |

* cited by examiner

*Primary Examiner*—David Brunsman
(74) *Attorney, Agent, or Firm*—Leydig, Voit & Mayer LTD.

(57) ABSTRACT

Disclosed is a method for preparing a modified starch hydrolysate that has a relatively reduced tendency to become sticky as compared with the unmodified starch hydrolysate. The method includes the step of compacting a starch hydrolysate, preferably via roller compaction. Also disclosed is a modified starch hydrolysate. The compacted starch hydrolysates may be transported readily, and is useful in numerous applications, including poultry feed applications.

22 Claims, No Drawings

COMPACTED STARCH HYDROLYSATE PRODUCT WITH IMPROVED HANDLING CHARACTERISTICS AND REDUCED TENDENCY TO BECOME STICKY

PRIOR APPLICATION

This application claims priority to prior provisional application Ser. No. 60/139,184, filed Jun. 15, 1999, the entire contents of which are incorporated by reference.

TECHNICAL FIELD OF THE INVENTION

The invention is in the field of starch hydrolysates, in particular maltodextrins and other malto-oligosaccharides. More particularly, the invention relates to modification of such starch hydrolysates to impart improved characteristics.

BACKGROUND OF THE INVENTION

Starch hydrolysate products are commonly spray dried, providing fine particle products which have relatively poor flow and bulk handling properties. Under humid conditions, these products will pick up moisture, become sticky, and form into large agglomerates or even solubilize into a sticky mass. They are not suitable for bulk shipping. In particular, when the starch hydrolysate is intended as an animal feed, in particular, a poultry feed, the stickiness that develops upon exposure to ambient moisture can plug handling equipment, and can prevent the animal feed from being transportable in normal process conveying equipment, such as bulk bins and auger conveyors. In particular, compressive forces at the discharge location of a bulk bin can cause sticky starch hydrolysate particles to compress and to form a solid, unitary mass.

The prior art has provided controlled agglomeration techniques, which provide products that can be handled in bulk and provide improved flow. However, agglomerated products have a relatively low bulk density, which often is undesirable. Moreover, compaction of dried starch hydrolysates can provide a more dense, free-flowing product. In U.S. Pat. Nos. 4,810,307 and 4,954,178, particles of starting material are blended with a volatile liquid other than water, and the resulting blend is compacted. The volatile liquids required by the processes disclosed in these patents are undesirable as they are released and must be dealt with via expensive measures.

It is a general object to provide a method for preparing a starch hydrolysate product that has reduced tendency to become sticky. Another general object is to provide such a starch hydrolysate.

THE INVENTION

It has now been found that starch hydrolysates can be compacted without an added volatile liquid to form a compacted product that has a relatively reduced tendency to become sticky in the presence of ambient moisture. Generally, the converted product further will have a reduced tendency to become compressed, and thus when subjected to pressures in bulk handling, the product will have a reduced tendency to form a unitary mass. The invention generally contemplates compaction, preferably roller compaction, of a starch hydrolysate. In certain embodiments, the starch hydrolysate is compacted without any added liquid, and in other embodiments, a liquid may be used, but the hydrolysate is compacted without any added liquid that is more volatile than water. Other means of compacting the starch hydrolysate include pellet milling and extrusion.

The resulting compacted starch hydrolysate exhibits improved bulk handling characteristics and a reduced tendency to become sticky if exposed to moisture during humid storage. The invention offers product with potential uses in animal feed applications such as for poultry and swine and in food applications where bulk handling is a necessity. The starch hydrolysate used in such applications preferably is a maltodextrin or syrup solid (e.g., a corn syrup solid).

The invention finds particular applicability in the field of poultry feeds, in particular, specialty, high carbohydrate feeds. In accordance with this aspect of the invention, a poultry feed is prepared from a starch hydrolysate, optionally with an additional poultry nutrient, by compacting the starch hydrolysate or nutrient/hydrolyzate blend under sufficient compaction pressure to provide a compacted product that has a relatively reduced tendency to become sticky in the presence of ambient moisture. The poultry feed thus prepared can be more readily transported, and will have a greater tendency to remain in the form of particles of a size suitable for feeding to a poultry bird. The hydrolysate also will have a reduced tendency to become compressed. The compacted product thus is particularly suitable for transport in bulk.

DESCRIPTION OF PREFERRED EMBODIMENT

The invention contemplates the modification of a starch hydrolysate via compaction, or the modification of a blend of starch hydrolysate with one or more other components. Of the numerous starch hydrolysates known in the art, the invention finds particular applicability in connection with malto-oligosaccharides, which include maltodextrins and syrup solids. More generally, by "malto-oligosaccharides" is contemplated any species comprising two or more saccharide units linked predominately via 1–4 glycoside linkages, and including maltodextrins and syrup solids. Those malto-oligosaccharides and mixtures of malto-oligosaccharides having a DE (dextrose equivalent) less than 20 are known as maltodextrins; malto-oligosaccharide mixtures having a greater DE are known as syrup solids.

Malto-oligosaccharides most typically are provided as mixtures of a plurality of individual malto-oligosaccharide species. In preferred embodiments, at least 50 percent of the saccharide units in the malto-oligosaccharide are linked via 1–4 linkages. More preferably, at least about 60 percent of the saccharide units are linked via 1–4 linkages; even more preferably, at least about 80 percent of the saccharide units are so linked. The malto-oligosaccharides may include saccharide species having an odd DP (degree of polymerization) value, and the DP profile of the malto-oligosaccharide mixture may be partially defined by a saccharide species having a DP value of 1, for example, dextrose or sorbitol. The mixture further may include other saccharide species or other components. The malto-oligosaccharide mixture may be a reduced malto-oligosaccharide mixture, as disclosed, for example, in copending international application Ser. No. PCT/US9901098, filed Jan. 19, 1999, which application designates the United States.

The invention is particularly applicable to malto-oligosaccharide species in which at least a portion of the malto-oligosaccharides in the mixture have a DP value greater than 5. Preferably, at least one of the malto-oligosaccharide species in the mixture has a DP value of 8 or more. More preferably, at least one species has a DP value of at least 10. For example, in preferred embodiments of the invention, at least 80 percent of the malto-oligosaccharide species in the mixture have a DP greater than 5, and at least 60 percent may have a DP greater than 8. In another embodiment, at least 80 percent of the malto-oligosaccharides species have a DP greater than 10. In some embodiments of the invention, the DP profile of the starting mixture is such that at least 75 percent of the malto-oligosaccharides species in the mixture have a DP greater than 5 and at least 40 percent of the species in the mixture have a DP greater than 10.

Suitable malto-oligosaccharides are sold as maltodextrins under the trademark MALTRIN® by Grain Processing Corporation of Muscatine, Iowa. The MALTRIN® maltodextrins are malto-oligosaccharide products, each product including a mixture of malto-oligosaccharide species and having a known typical DP profile. Suitable MALTRIN® maltodextrins that may be used in conjunction with the present invention include, for example, MALTRIN® M040, MALTRIN® M050, MALTRIN® M100, MALTRIN® M150, and MALTRIN® M180. Typical approximate DP profiles of the subject MALTRIN® maltodextrins are set forth in the following table (the DP profiles being approximate as indicated in the table):

|            | Typical DP profile (% dry solids basis) | | | | |
| --- | --- | --- | --- | --- | --- |
| DP profile | M180 | M150 | M100 | M050 | M040 |
| DP > 8 | 46.6 ± 4% | 54.7 ± 4% | 67.8 ± 4% | 90.6 ± 4% | 88.5 ± 4% |
| DP 8 | 3.9 ± 2% | 4.8 ± 1.5% | 4.5 ± 1.5% | 1.5 ± 1% | 2.0 ± 1% |
| DP 7 | 9.5 ± 2% | 9.1 ± 1.5% | 7.0 ± 1.5% | 1.5 ± 1% | 2.4 ± 1% |
| DP 6 | 11.4 ± 2% | 8.4 ± 1.5% | 6.1 ± 1.5% | 1.4 ± 1% | 1.8 ± 1% |
| DP 5 | 5.9 ± 2% | 4.7 ± 1.5% | 3.3 ± 1.5% | 1.3 ± 1% | 1.3 ± 1% |
| DP 4 | 6.4 ± 2% | 5.5 ± 1.5% | 3.7 ± 1.5% | 1.1 ± 1% | 1.4 ± 1% |
| DP 3 | 8.3 ± 2% | 6.7 ± 1.5% | 4.2 ± 1.5% | 1.0 ± 1% | 1.4 ± 1% |
| DP 2 | 6.2 ± 2% | 4.8 ± 1% | 2.5 ± 1% | 0.8* ± 1% | 0.9* ± 1% |
| DP 1 | 1.8 ± 1.5% | 1.3 ± 1% | 0.7* ± 1% | 0.8* ± 1% | 0.3* ± 1% |

*MINIMUM VALUE = 0%

Other suitable malto-oligosaccharides include other maltodextrins, such as MALTRIN® M440, MALTRIN® 510, MALTRIN® M550; MALTRIN® M580, an MALTRIN® M700, as well as corn syrup solids such as MALTRIN® M200 and MALTRIN® M250 (these having a DE >25). The invention is not limited to malto-oligosaccharides species, and indeed the invention is contemplated more generally to be applicable to other starch hydrolysates including, for example, starch hydrolysates derived from crude or cereal flour, such as wheat or corn flour.

In accordance with the invention, the starch hydrolysate is compacted under sufficient compaction pressure to provide a compacted starch hydrolysate that has a relatively reduced tendency to become sticky in the presence of ambient moisture. The starch hydrolysate may be compacted via any suitable means, but most preferably, the hydrolysate is compacted via roller compaction, pellet milling, or extrusion. The compaction pressure should be such as to provide a compacted product that has a relatively reduced tendency to become sticky relative to the pre-compacted starch hydrolysate. This pressure preferably ranges from about 500 to about 2000 psi, most preferably about 1500 psi. When roller compaction is employed, it is preferred that, not counting any moisture content of the starch hydrolysate, the starch hydrolysate is compacted in the absence or substantial absence of any liquid that is more volatile than water; more preferably, not counting native starch moisture, the starch is compacted under anhydrous conditions; and most preferably, the starch hydrolysate is compacted in the absence or substantial absence of any added liquid.

When pellet milling or extrusion is employed, it is generally contemplated that a liquid such as water or a lubricant will be added. Preferably, no liquid that is more volatile than water is added. In particular, in a pellet milling operation, the total moisture content (including native moisture present in the starch hydrolyzate) should range from about 4% to about 12% by weight of the starch hydrolysate (or by weight of the blend if an additional nutrient is added). More preferably, the total moisture content ranges from about 6% to about 10%, and even more preferably, the total moisture content ranges from about 7% to about 9%.

The "stickiness" or tackiness of the starch hydrolysate can be evaluated by any suitable method. In accordance with one such method, a 15 g sample is spread out on a Petri dish, and the dish is placed in a glass container with a saturated solution of salt water and held for one week. Stickiness can be observed and a score assigned as follows:
0=No observed change, no stickiness.
1=Slight sticking of particles.
2=Obvious sticking together, break apart.
3=Particles sticking together, do not flow.
4=Almost melted appearance, can still observe some particles.
5=Melted, flowed together, lack of distinct particles.

The invention further encompasses a method for transporting a starch hydrolysate. In accordance with this aspect of the invention, the starch hydrolysate is compacted as discussed above, preferably in the absence or substantial absence of other ingredients except optionally a lubricant to aid in compaction, and the compacted starch hydrolysate then is transported. Most preferably, the starch hydrolysate is reduced to particles of a size suitable for transport and bulk conveyance, which typically is a size in the range of about 4 mesh to about 14 mesh. If the starch hydrolysate is compacted via roller compaction or extrusion, the compacted starch hydrolysate initially will be in the form of a larger agglomerated mass, and a subsequent processing step such as granulation should be employed to reduce the starch hydrolysate to particles. If pellet milling is employed, the pellets produced by the mill may be of a suitable size, but more commonly, the pellets will require crumbling to reduce them to a suitable size. The starch hydrolysate is particularly suitable for bulk transport, such as via rail car or truck. Because the starch hydrolysate will have a relatively reduced tendency to compress and to become sticky in the presence of ambient moisture, agglomeration of the starch hydrolysate particles and related problems generally associated with bulk transport of starch hydrolysates may be substantially mitigated.

The compacted starch hydrolysate may be used in numerous applications, including feed, food, and pharmaceutical applications including dry mix products, such as beverages, spice blends, sauces, gravies, and sports bars. Most particularly, the invention finds applicability in the field of feeds for cattle, swine, poultry birds, such as chickens, geese, and turkeys. In accordance with this aspect of the invention, a method for feeding a poultry bird is provided. Generally, the method includes the steps of providing a compacted starch hydrolysate, and feeding the compacted starch hydrolysate to a poultry bird. The compacted starch hydrolysate provides a dense, readily digestible carbohydrate that retains good transport handling properties when exposed to elevated humidity levels and increased compression forces experienced during bulk storage and conveyance. Most preferably, the poultry feed includes additional poultry nutrients, such as proteins, vitamins, minerals, and other carbohydrates. The invention is contemplated to encompass a poultry feed that comprises a compacted blend of the starch hydrolysate and the additional poultry nutrient. Such poultry feed may be prepared by blending the starch hydrolysate with the additional poultry nutrient, and compacting the resultant blend as discussed above.

The following Examples are provided to illustrate various aspects of the invention.

EXAMPLE 1

Roller Compaction

Starch hydrolysate products (MALTRIN® M040, M100, M150, and M180 maltodextrin, available from Grain Processing Corporation of Muscatine, Iowa) were successfully compacted on a Chilsonater (Model 4LX10D, Fitzpatrick Company) using a roller pressure of 1500 psig, a constant water temperature of 88° C. for both inlet and outlet water, and a roll speed of 11–24 RPM. The compacted product was reduced in size to less than about 4 mesh and larger than about 14 mesh using a Fitzmill system (Model DK AS012, Fitzpatrick Company).

Impact of Humidity

Samples were stored for one week in chambers with controlled humidity. Both the granular form product of the invention and control (standard spray dried) products were evaluated for moisture up-take and general appearance. Observation results are in Table 1. This test demonstrated the trend toward better appearance and reduced tendency to become sticky for the product of the invention than for the control product. This property allows for improved handling and the ability to move and use bulk shipments.

TABLE 1

Observation Scores

| Storage Relative Humidity | MALTRIN® | DE | Observations* Standard Product | Granular Product by Compaction |
|---|---|---|---|---|
| 90% | M040 | 5 | 3 | 2 |
|  | M100 | 10 | 5 | 4 |
|  | M150 | 15 | 5 | 5 |
|  | M180 | 18 | 5 | 5 |
| 75% | M040 | 5 | 2 | 1 |
|  | M100 | 10 | 3 | 1 |
|  | M150 | 15 | 4 | 3 |
|  | M180 | 18 | 5 | 3 |

TABLE 1-continued

Observation Scores

| Storage Relative Humidity | MALTRIN® | DE | Observations* Standard Product | Granular Product by Compaction |
|---|---|---|---|---|
| 52% | M040 | 5 | 0 | 0 |
|  | M100 | 10 | 0 | 0 |
|  | M150 | 15 | 0 | 0 |
|  | M180 | 18 | 1 | 0 |

*Table 1 Observation Key:
0 = No observed change, no stickiness.
1 = Slight sticking of particles.
2 = Obvious sticking together, break apart.
3 = Particles sticking together, do not flow.
4 = Almost melted appearance, can still observe some particles.
5 = Melted, flowed together, lack of distinct particles.

EXAMPLE 2

Pelletizing

Compacted starch hydrolysate products were prepared using either a pilot pellet mill or a commercial pellet mill. Pellet mill conditions were dependent upon product formulation ingredients and levels.

Tempering and Added Lubricants

Pelleted products were prepared using Maltrin M040, a 4-7 DE (dextrose equivalent) maltodextrin and Maltrin M150, a 13-17 DE maltodextrin. The maltodextrins, which had initial moisture contents ranging from 4–5.5% were tempered to finished blend moistures ranging from 4–12% using a blender (suitable blending techniques include ribbon blending, Hobart mixing, or blending in a V-blender) to gradually and uniformly combine the powder with the added water. Moisture contents were determined using an Ohaus moisture analyzer. Small amounts of lubricants were added to the tempered maltodextrins to improve lubricity in the pellet mill. The lubricants included glycerol monostearate, choice white grease, corn oil, and lecithin. Lubricants were added at levels ranging from 0–4% of the finished formulation either prior to or post tempering (with water) using the same blenders employed to incorporate the added water.

Pilot Pelleting

Pilot pelleting was performed using a California Pilot Mill (California Pellet Mill Model CL5) equipped with a die having a diameter ranging from 3/32 inch to 3/16 inch and die thickness ranging from one-half inch to 1¼ inch. Die speeds of 20 and 450 RPM were evaluated. It was found that product melting and die binding occurred at 450 RPM, and thus a die speed of 250 RPM was selected for subsequent pelletizing.

In subsequent pelleting, neither conditioner steam nor water were added. Product temperature and mill amperage were recorded as indicators of pellet mill "work" level. The feed setting was adjusted to optimize output while maintaining mill amperage levels in the 2.9–3.5 amp range. Greater amperage levels were believed to result in pellet mill overheating, die binding, and subsequent mill shutdown. Amperage levels below 2.9 resulted in inadequate product binding and a loss of pellet production. It should be noted that these conditions are exemplary of the particular starch hydrolysate and equipment employed, and it is contemplated that the optimum feed settings and amperage ranges will vary according to product formulation and pellet mill model and size.

The Maltrin M040 and M150 compacted products described in Table 2 herein below were prepared by blending the maltodextrin with 2% MYVAPLEX (a monoglyceride lubricant sold by Eastman Chemical Co.) followed by slowly spraying water onto the surface of the dry material while employing continuous blending. Both compacted products were tempered to a targeted moisture range of 7.8–8.2%. The die speed was 250 RPM.

The pelleted M150 was produced using a 3/32 inch diameter die that was 5/8 inch thick and the feed setting was varied from 50–60 out of a full range of 0–80. Under these conditions, the pellet mill amperage remained in the 2.8–3.3 amp range and the product temperature varied from 37.7° C. (feed rate of 50) to 76.7° C. (feed rate of 60).

The pelleted M040 was produced using a 3/32 inch diameter die that was 5/8 inch thick and the feed setting was varied from 52–75. Under these conditions, the pellet mill amperage remained in the 3.1–3.5 amp range and the product temperature varied from 45° C. (feed rate of 58) to 71° C. (feed rate of 52).

Production Pelleting

Production pelleting was performed using a commercial pellet mill (California Pellet Mill-Century 100 Model) equipped with a 5/32 inch diameter relief die having a thickness of 2 inches. Steam was not utilized and the feed rate was varied with the M1250 and M040 to keep the product temperature from surpassing the glass transition temperature for the respective maltodextrin that had been tempered to approximately 8% finished moisture. A lubricant (glycerol monostearate) was added at a 1–4% level to further reduce pelleting temperature rise and to prevent liquefaction inside the pellet mill die.

Impact of Humidity

Samples were held in chambers having controlled humidities of 52%, 75%, and 90%, respectively. After one week, the moisture content of the samples was determined and observations were made relative to the adhesive (stickiness) properties of the samples. The observation scores were noted in Table 2.

The compacted product of the invention had a reduced tendency to become sticky relative to the corresponding uncompacted product (Table 1). Neither compacted Maltrin M040 nor M150 had observable development of stickiness at either 52% or 75% relative humidity. At 90% humidity, both pilot and commercially pelleted M150 developed adhesive properties and did not flow, while the compacted M040 demonstrated no adhesive properties and remained free-flowing.

TABLE 2

Observation Scores

| Storage Relative Humidity | MALTRIN® | DE | Observations* Standard Product | Granular Product By Pelletizing Pilot Pellet Mill | Commercial Pellet Mill |
|---|---|---|---|---|---|
| 90% | M040 | 5 | 3 | 0 | 0 |
|  | M150 | 15 | 5 | 3 | 3 |
| 75% | M040 | 5 | 2 | 0 | 0 |
|  | M150 | 15 | 4 | 0 | 0 |
| 52% | M040 | 5 | 0 | 0 | 0 |
|  | M150 | 15 | 0 | 0 | 0 |

*Table 2 Observation Key:
0 = No observed change, no stickiness.
1 = Slight sticking of particles
2 = Obvious sticking together, breaking apart.
3 = Particles sticking together, do not flow.
4 = Almost melted appearance, can still observe some particles.
5 = Melted, flowed together, lack of distinct particles From the foregoing results, it is seen that the compacted product generally was superior to the standard product at conditions of elevated humidity.

EXAMPLE 3

Handling Characteristics

A granular sample was provided to an outside laboratory for evaluation for bulk transportation in rail cars. The evaluation noted that the material could be readily handled by gravity, fluidized pneumatic, and pressure differential rail cars. In contrast, the standard spray dried products are not suitable for bulk rail handling.

EXAMPLE 4

Poultry Feed

A poultry feed is prepared by blending MALTRIN® M150, protein, vitamins, and minerals compacting the resultant blend compacted on a Chilsonater Model 4LX10D using a roller pressure of 1500 psig.

EXAMPLE 5

Poultry Feed

A poultry feed is prepared by compacting MALTRIN® M040 on a Chilsonater Model 42X10D using a roller pressure of 1500 psig.

It is thus seen that the general objects of the invention have been satisfied. The invention provides a compacted starch hydrolysate product and a method for compacting a starch hydrolysate. The compacted starch hydrolysate has a relatively reduced tendency to become sticky in the presence of ambient moisture, thus providing for improved bulk transport and handling properties. The invention also provides a poultry feed that overcomes drawbacks associated with other poultry feeds.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein are hereby incorporated by reference in their entireties.

What is claimed is:

1. A method for modifying a starch hydrolysate, comprising the steps of compacting said starch hydrolysate to provide a compacted starch hydrolysate that has a relatively reduced tendency to become sticky in the presence of ambient moisture, said starch hydrolysate being compacted via pellet milling.

2. A method according to claim 1, wherein said starch hydrolysate is a maltodextrin or syrup solid.

3. A method according to claim 1, wherein said starch hydrolysate is a maltodextrin.

4. A method according to claim 1, wherein said starch hydrolysate is reduced to a particle size in the range of about 4 mesh to about 14 mesh.

5. A method according to claim 1, wherein said starch hydrolysate is compacted in the presence of about 7% to about 9% total moisture.

6. The compacted product formed by the method of claim 1.

7. A method for feeding a poultry bird, comprising the steps of:
providing a poultry feed, said poultry feed having been prepared by a process including the steps of:
providing a starch hydrolysate; and
compacting said starch hydrolysate under sufficient compaction pressure to provide a compacted starch hydrolysate that has a relatively reduced tendency to become sticky in the presence of ambient moisture; and
feeding said poultry feed to a poultry bird.

8. A method according to claim 7, wherein said starch hydrolysate is a maltodextrin or syrup solid.

9. A method according to claim 7, wherein said starch hydrolysate is compacted via pellet milling.

10. A method according to claim 7, wherein said starch hydrolysate is compacted via roller compaction or extrusion.

11. A method for modifying a starch hydrolysate, comprising the steps of compacting said starch hydrolysate via pellet milling in the substantial absence of liquids that are more volatile than water to provide a compacted starch hydrolysate that has a relatively reduced tendency to become sticky in the presence of ambient moisture.

12. A method for preparing a poultry feed, comprising the steps of:
providing a starch hydrolysate;
blending said starch hydrolysate with a secondary poultry nutrient to form a blend; and
compacting said blend under sufficient compaction pressure to provide a compacted blend that has a relatively reduced tendency to become sticky in the presence of ambient moisture.

13. A method according to claim 12, wherein said starch hydrolysate is a maltodextrin or syrup solid.

14. A method according to claim 12, wherein said product is compacted via pellet milling.

15. A method according to claim 12, wherein said product is compacted via roller compaction or extrusion.

16. The poultry feed formed by the method of claim 12.

17. A method for transporting a mixture of malto-oligosaccharides, comprising the steps of:
compacting a blend consisting of a plurality of malto-oligosaccharide species and an optional lubricant under sufficient compaction pressure to provide a compacted blend that has a relatively reduced tendency to become sticky in the presence of ambient moisture; and
transporting said compacted blend.

18. A method according to claim 17, wherein said compacted blend is transported in the form of particles having a particle size in the range of about 4 mesh to about 14 mesh.

19. A method according to claim 17, wherein said blend is a maltodextrin.

20. A method according to claim 17, wherein said blend is compacted via roller compaction, pellet milling, or extrusion.

21. A method according to claim 17, wherein said transport is via bulk rail car.

22. A method according to claim 17, wherein said transport is via truck.

* * * * *